April 19, 1966   J. E. MALLETT ET AL   3,247,354
METHOD AND APPARATUS FOR ALIGNING STRIP IN
STRIP JOINING EQUIPMENT
Filed Sept. 26, 1962   3 Sheets-Sheet 1

INVENTORS
JOHN E. MALLETT
JOSEPH J. RILEY
BY
Francis J. Klempay
ATTORNEY

FIG:2

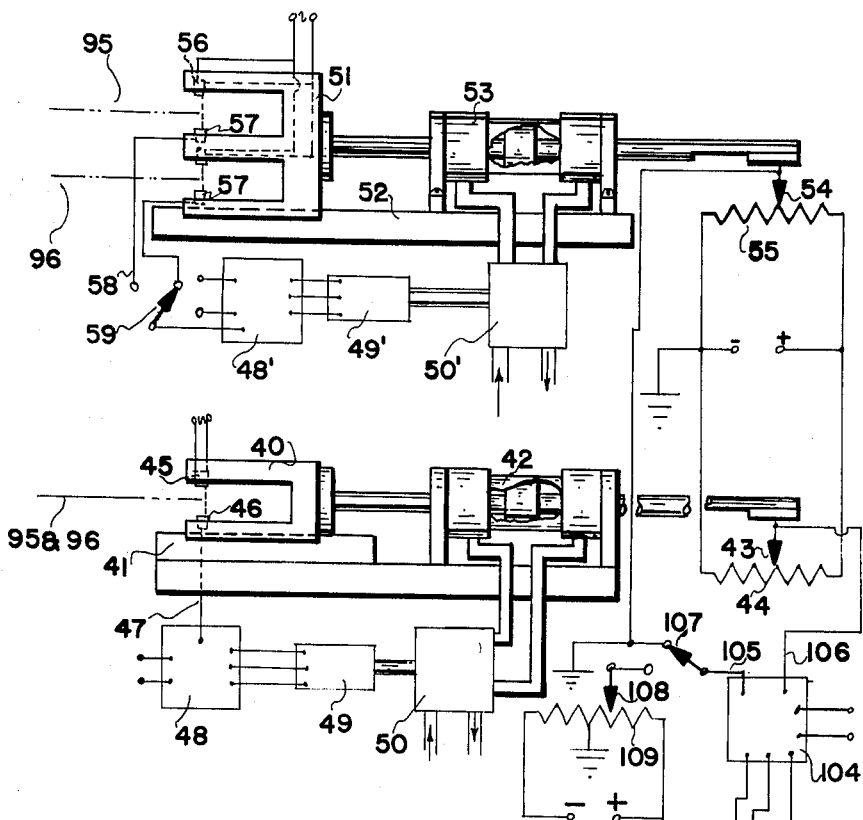
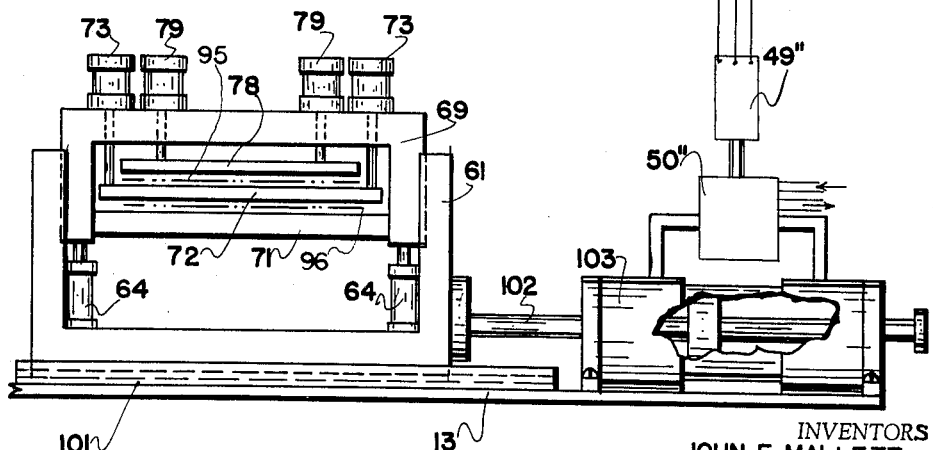
FIG. 3
INVENTORS
JOHN E. MALLETT
JOSEPH J. RILEY
BY
Francis J. Klempay
ATTORNEY

United States Patent Office 3,247,354
Patented Apr. 19, 1966

3,247,354
METHOD AND APPARATUS FOR ALIGNING STRIP IN STRIP JOINING EQUIPMENT
John E. Mallett, Chagrin Falls, and Joseph J. Riley, Warren, Ohio, assignors to The Taylor-Winfield Corporation, Warren, Ohio, a corporation of Ohio
Filed Sept. 26, 1962, Ser. No. 226,363
7 Claims. (Cl. 219—82)

This invention relates to equipment for joining metal strip in general end-to-end relation and more particularly to combined apparatus for rapidly positioning and cross-aligning the end portions of strip lengths in such equipment preparatory to the joining of the lengths. Such equipment is commonly used to supply various strip processing or utilization lines wherein the overall rate of production and/or quality of product are dependent on the speed with which the joint is made and the accuracy of the transverse alignment of the successive strip lengths.

It has been heretofore proposed, as in U.S. Patent No. 3,021,416 owned by the assignee of the present invention, to provide, in strip joining equipment, a pre-loading mechanism wherein the leading end portion of a new or successive coil of strip may be prepared (sheared) and thence moved into and held in proper longitudinal position in the joining station of the equipment while strip from a preceding coil is moving through the equipment. When the latter coil is exhausted, the moving strip is stopped and almost immediately the cycle of operation of the joining equipment can be initiated to make the joint between the tail end of one strip length and the pre-loaded head end of the other strip length. The present invention has, as its principal object, the provision, in strip joining equipment, of means to laterally align the pre-loaded head ends of strip with the tail ends of stopped strip lengths in a rapid and accurate manner. Further, we provide an arrangement whereby the aligning may be done during the last increment of movement of the moving strip before it stops. This is highly advantageous in that the added feature of cross-alignment adds little or no time to the overall joining cycle.

Another object of the invention is to provide not only for the rapid and accurate edge alignment of strip to be joined when the two strip lengths are of equal width but also for automatically centering the strip lengths on their longitudinal center lines when the succeeding lengths are of different widths.

The above and other objects and advantages of the invention will become apparent upon consideration of the following specification and the accompanying drawing wherein there is disclosed a preferred embodiment of the invention as applied to an electric resistance narrow lap seam welder for joining strip in general end-to-end relation.

In the drawing:

FIGURE 3 is a schematic showing of the operative parts of FIGURE 1 which implement the use of our invention in the apparatus of FIGURE 1.

Figure 1:
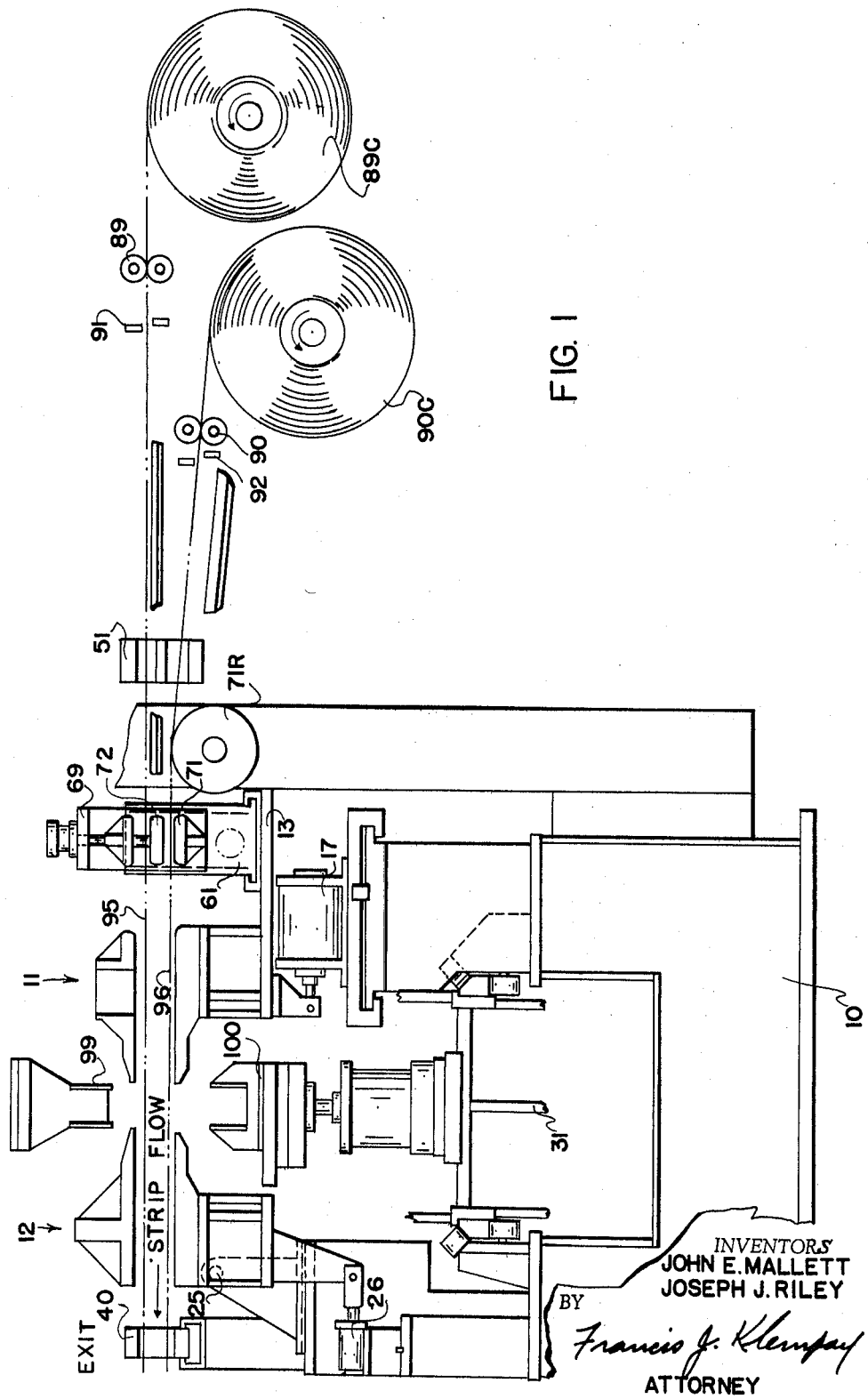
FIGURE 1 is a side elevation of strip joining apparatus utilizing the principles of our invention.

While the principles of our invention may be applied to various kinds of strip joining apparatus, we have herein illustrated the invention as applied to a narrow overlap electric resistance seam welder of the kind illustrated and described in the aforementioned U.S. Patent No. 3,021,416. Thus, reference numeral 10 designates a base on which is pivotally mounted a transversely extending strip clamping assembly 12 and a longitudinally slideable but transversely extending strip clamping assembly 11. Assembly 11 is mounted on a transversely extending and longitudinally slideable plate 13 arranged to be moved back and forth by a cylinder 17. Assembly 12 is mounted for pivotal movement about transverse axis 25 and is arranged to be pivoted up and down by a cylinder 26. While not particularly shown, it will be understood by those familiar with the art, that each of the clamping assemblies 11 and 12 have a bottom platen and a top platen carried and guided thereby for vertical movement as well as cylinders or other operative means to alternately raise the top platen to allow the strip to pass between the platens and to close the top platen hard onto the lower platen to clamp the strip.

Figure 2:
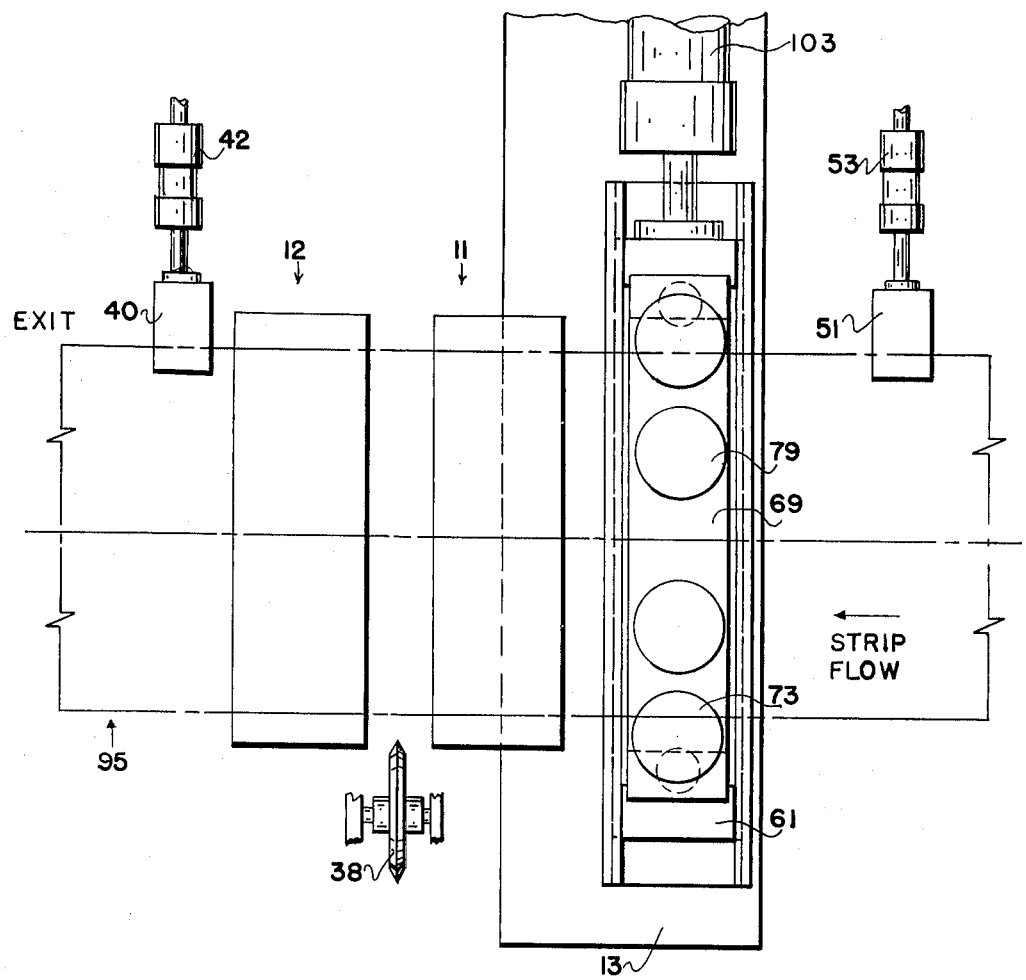
FIGURE 2 is a fragmentary plan view of the apparatus of FIGURE 1.

As shown more fully in the aforementioned U.S. Patent No. 3,021,416, the illustrated apparatus comprises a transversely extending subframe 31 which is suitably supported and guided in the main frame 10 for movement in a horizontal direction which is at right angles to the path of travel of the strip through the equipment. This subframe 31 has a large opening or window in it through which the strip may pass longitudinally, and at one lateral portion of this window there is mounted a double shear 99, 100 while in another lateral portion of this window there is mounted a pair of upper and lower welding wheel electrodes, one of which is shown at 38 in FIGURE 2.

The operation of the apparatus thus briefly described above is such that with the tail end of a strip length held in clamp 12 within the projection of shear 99, 100 and with the leading end of another or next successive strip length being held in clamp 11 also within said projection actuation of the shear will trim off these strip end portions. Immediately thereafter and upon opening of the shear, the exit clamp 12 is tilted upwardly by actuation of cylinder 26 and simultaneously cylinder 13 is actuated to slide the entry clamp 11 toward the clamp 12 a controlled distance so that upon the clamp 12 being returned to its initial position the strip ends will be overlapped uniformly and to the exact extent desired. The subframe 31 is now moved laterally of the strip to permit the wheel electrodes to engage opposite sides of the overlap strip end portions and seam weld them together.

Also as disclosed in the aforementioned prior patent, a pair of pinch rolls 89 is provided to draw off strip from a coil 89C and with the aid of suitable supports and guides to propel the leading end portion of this strip into and slightly beyond the clamp 11 along an upper path 95. Similar pinch rolls 90 mounted on a lower level than the pinch rolls 89 are provided to draw off strip from a second coil 90C and to propel the leading end portion thereof through and slightly beyond the clamp 11. In conformity with the teachings of the aforementioned prior patent, we provide a pre-loading strip clamp having a base 61 in which is vertically slideable an inverted U-shaped member 69 mounting at its lower end a clamping platen 71. Also carried by the member 69 is an intermediate clamping platen 72 arranged to be raised and lowered by cylinders 73 mounted on member 69. Member 69 also carries an upper clamping platen 78 which is raised and lowered by cylinders 79 also carried by member 69. The whole assembly of the member 69 and parts carried thereby may be raised and lowered by cylinders 64 which are carried by the base 61.

The operation of the pre-loading clamp described immediately above is as follows:

Assuming that all the clamps are opened as illustrated in FIGURE 1 and that strip from coil 89C is running through the equipment along path 95, the leading end of the strip from coil 90C may be fed into the paths of pinch rolls 90 and cropped off by a shear 92 which is positioned adjacent to but forwardly of pinch rolls 90. At this time the member 69 and consequently the pre-loading strip clamping platen 71 will be in lowermost position so that upon restarting the pinch rolls 90 after operation of shear 92 the leading end portion strip from the coil 90C will be directed over a support roll 71R, over platen 71 and thence into the open clamp 11 until the leading end of this strip is within the projection of the shear 99, 100. This strip moves along a lower path 96 free and clear of the strip moving along the path 95. Upon the leading end of the strip in path 96 reaching its proper position within the projection of the shear the cylinders 73 are energized to move the intermediate clamping platen 72 down onto the strip to tightly clamp the same against platen 71. This holds the strip in proper position pending the paying off of coil 89C and the positioning of the tail end of the strip from coil 89C within the projection of the shear. When strip is being paid off the coil 90C and it is desired to prepare and load the leading end of the strip from coil 89C the cylinders 64 are actuated to raise the member 69 to thus elevate the clamping pass between platen 72 and 78. This keeps this leading end portion of the strip from coil 89C well elevated to assist in holding the strip end lying therein and extending along path 95 well above the strip-moving in path 96. After the leading end of the strip from coil 89C is properly positioned in the projection of the shear this strip length is clamped by actuation of cylinders 79 and the consequent closing of platen 78 onto the platen 72. After the trailing end of the exhausted coil 90C is properly positioned within the shear projection the member 69 is lowered to permit the upper strip to move downwardly with the upper platen of entry clamp 11 to thereby allow the upper strip to have a flatter relation with the lower platen of this clamp 11.

It should now be understood that during normal operation of the pre-loading mechanism described above that the leading end portion from the new coil of strip is secured in the pre-loading clamp for some length of time while the strip from the other coil is being paid out and while the tail end of such strip from the other coil is being positioned within the projection of the shear. In accordance with the principles of this invention we utilize the last portion of this time interval to align the new strip laterally with respect to the old strip so that immediately upon the adjacent ends of the two strip lengths being properly positioned the clamps 11 and 12 can be closed onto the two properly aligned strip lengths. We accomplish this by apparatus now to be described.

Positioned at the exit end of the strip joiner we provide a U-shaped carrier 40 positioned to fit over the side edge of strip extending out the exit end of the strip joiner and slideably mounted and guided for horizontal movement transverse to the path of strip movement on a support 41. Carrier 40 is connected to one end of the piston rod of a double acting cylinder 42, the opposite rod end of which supports, in insulated relation, a sliding contact 43. Contact 43 rides on a linear resistor 44 which is connected across a source of D.C. potential whereby a variable reference voltage is impressed on contact 43. Mounted on one leg of the carrier 40 is a lensed light source 45 while opposite on the other leg is mounted a photocell 46. The assembly of the parts 45 and 46 is of the known kind in which an output voltage may be impressed on an output conductor 47 in proportion to the extent that the beam of light is interrupted by the edge portion of the strip extending outwardly of the exit end of the strip joiner. If the beam is fully blocked off the voltage in lead 47 will be at some minimum value while if the edge of the strip is free and clear of the beam the voltage will be at some maximum value. When the edge of the strip is in the middle of the beam, for example, the output voltage will be approximately midway between said maximum and minimum values. These characteristics are utilized in our invention to control the actuation of double-acting cylinder 42 in such manner that the carrier 40 will "float" with the position of the side edge of the strip to maintain the light beam equally divided by the edge portion of the strip. The purpose of this is, of course, to derive a reference voltage on the contact 43 directly proportional to the lateral position of the strip edge. To accomplish this, the voltage at output lead 47 is impressed on a control 48 which is operative to energize an electromotive means 49 in opposite directions or not at all. The motive means 49 has its mechanical output member connected to the spool of a four-way valve 50 whereby the piston in cylinder 42 may be caused to remain at rest or to move in one direction or the other, it being observed that the cylinder ports of the valve 50 are connected to opposite ends of the cylinder 42.

Control 48, per se, is of known construction in the electric servo-mechanism art and/or may readily be devised by anyone skilled in the electrical and electronic arts. It operates in such manner that if the voltage on control input 47 is midway between the maximum and minimum voltages discussed above its output leads will not be energized and the motive means 49 will accordingly remain at rest. If now the strip should be moved further into the throat of the carrier 40 the resultant decrease in potential on the conductor 47 will cause control 48 to react in such manner that the motive means 49 will be energized in a direction to cause hydraulic cylinder 42 to withdraw the carrier 40 further from the strip and thus maintain the bisection of the light beam. Conversely withdrawal of the strip from the light beam will increase the potential on lead 47 and the control 48 will react to energize motive means 49 in the opposite direction and so energize cylinder 42 that the carrier 40 will be moved toward the strip. In this manner the reference voltage derived at 43 is always related to the position of the edge of the strip with respect to the laterally fixed parts of the complete strip joining assembly.

At the entry end of the equipment we provide a horizontally disposed double U-shaped carrier 51 which is slideably mounted for horizontal movement laterally of the paths of travel of the strip on a fixed base 52. Carrier 51 is connected to one end of the piston rod of a double-acting cylinder 53, the other end of this rod carrying, in insulated relation, a slide contact 54 which rides on a linear resistor 55 also connected to the D.C. source which is impressed across resistor 44. Carrier 51 has two vertically spaced throats for receiving the edges of strip moving along the paths 95 and 96 and each of these throats is provided with a lensed light source 56 and a photocell 57 which operate in the same manner as does the edge detector 45, 46. Cells 57 have individual output leads 58 which are selectively engaged or contacted by a switch 59 manually or under automatic control, not shown, the arrangement of course being such that during the sequence of operation of the overall equipment only the lateral position of the pre-loaded strip end portion is sensed by the photocells 57.

Cylinder 53 is under the control of a four-way valve 50' which in turn is actuated by a reversible electromotive device 49', and it should be understood that the devices 49' and 50' are well known and available in the market and operate in the same manner as do the devices 49 and 50 previously described. Likewise, the motive device 49' is connected to be controllably energized in opposite directions by a control device 48' which is identical with the control device 48 previously described and which recieves its command signal (voltage) from the switch contact 59. From this description, it will be understood that the voltage derived at contact 54 will be precisely proportional to the position of the edge of the strip in either path 95 or 96 as related through the fixed base 52. Since the latter is fixed with respect to support 41 the lateral position of the strip edge in carrier 51 will be determined in relation to the lateral position of the strip edge in carrier 40 and expressed electrically by the coincidence or variation in either direction of the potentials derived at 43 and 54. This coincidence or deviation in either direction is utilized, in accordance with the illustrated embodiment of our invention and through servo-mechanism now be described, to compel either a coincidence or a predetermined offset in the lateral alignment of the pre-loaded strip edge in carrier 51 with respect to the strip edge in carrier 40.

Rigidly mounted on the slide plate 13 is the transversely extending guide plate 101 in which is slideably mounted the member 61 carrying the double pre-loading strip clamps described above. Member 61 is connected to and is adapted to be reciprocated by the piston rod 102 of a double-acting hydraulic cylinder 103. This cylinder 103 is controlled by a four-way valve 50" which in turn is actuated by a reversible electromotive means 49". Motive means 49" is controllably energized in opposite directions by a control 104 which is commanded by a voltage difference and polarity of the difference appearing across a pair of input leads 105 and 106. Control 104 is of a known type available in the trade and operates in such manner that when no potential appears across leads 105 and 106 its output circuit to motive device 49" is entirely de-energized. When a potential difference does appear the output circuit is energized in one direction or the other, depending on the polarity of the difference. As shown, the lead 105 is connected to the common terminal of a selector switch 107 which in one position is connected to contactor 54 and which in the other position is connected to a sliding contactor 108 of a biasing resistor 109. The increment of biasing potential picked up by the latter circuit is, of course, adjustable, and in practice is made sufficient to precisely compensate for the unbalance desired in the relative positions of the contactors 43 and 54 when a succeeding strip length of a different width is to be joined and when it is desired that the joining is to take place with the longitudinal center lines of the strip lengths in coincidence. Otherwise, it will be understood that the potential difference and polarity of the difference appearing across command leads 105 and 106 will be determined by the summaton of the potentials appearing across resistors 44 and 55 to the right of the contractors 43 and 54, as viewed in FIGURE 3.

Considering now the operation of the control apparatus above described, it should be noted first that a reference potential is developed on contact 43 which is related to the position of the edge of the strip in the carrier 40. This is the strip which is being paid off from one of the coils and is moving through the joining apparatus. During pre-loading of the leading end portion of the next succeeding strip length to be joined the position of switch 59 is selected to sense the edge position of the strip being pre-loaded. To prevent wide hunting and excessive wear, suitable sequence control, not shown, may be provided to hold off operation of all of the control means shown in FIGURE 3 until the first strip length has slowed down almost to a stop. By this time, of course, the pre-loading clamp will have been properly energized as described above so that lateral sliding movement of the member 61 by the cylinder 103 will shift the pre-loaded head end portion of the new strip sideways tending to bring it into alignment with the strip being stopped. Effective cross alignment can take place not only during the last increment of movement of the first strip but also during the interval of time that it takes to close the clamp 11 onto the pre-loaded new strip length. This arrangement enables effective cross alignment of the two strip lengths to be made in the joining equipment while adding little or no time to the overall time cycle of the equipment.

It should now be apparent that we have provided an effective and quick-acting arrangement for laterally aligning strip lengths to be joined in general end-to-end relation which accomplishes the objects initially set out above. The aligning takes place rapidly and automatically while the joining equipment is being sequenced through its necessary operations so that little or no added time is required for the transverse aligning step and the joining equipment may therefore be operated at substantially its maximum speed of cyclic operation. Further, by interposing the bias 108, 109 in the control circuit for the servomechanisms 49" and 50" it is possible to compensate for unequal width in successive strip lengths whereby these lengths are aligned along their longitudinally extending center lines.

The specific instrumentalities described above and used to implement our invention in the specific embodiment chosen for disclosure herein should be considered as illustrative only as obviously many changes may be made therein without departing from the spirit or scope of the invention. For example, it is readily conceivable that the hydraulic servomechanisms may be replaced with controlled electrical motive means, and that jets of air may, in accordance with known principles, be utilized to detect the edge positions of the strip rather than the light beam systems referred to above. Reference should therefore be had to the appended claims in determining the scope of the invention.

We claim:

1. In apparatus for joining metal strip lengths in general end-to-end relation and wherein means is provided to pre-load the head end portion of a second strip length into proper joining position within said apparatus while a first length of strip is running through said apparatus the improvement comprising means positioned at the exit end of said apparatus to detect the position of an edge of the first strip length, means to detect the position of the same side edge of the pre-loaded second strip length at a location adjacent the entry end of said apparatus, and automatic means comprising one of a superimposed pair of strip clamps to shift said head end pre-loaded portion of said second strip length laterally with respect to said first strip length when said first strip length is being brought to a stop preparatory to a joining cycle, said means to shift being controlled by the appearance of an unbalance between the outputs of the recited two means to detect.

2. Apparatus according to claim 1 further characterized in that said means to shift comprises a clamp for the pre-loaded head end portion of said second strip length, said clamp being separate from the strip joining means, and means to move said clamp transversely of the normal path of longitudinal travel of the strip through said apparatus.

3. Apparatus according to claim 1 further characterized in that said control means for said means to shift includes provision for the introduction of a factor to compensate for differences in width of said first and second strip lengths whereby said strip lengths may, if desired, be aligned with respect to their longitudinal center lines rather than with respect to their side edges.

4. Apparatus according to claim 1 further characterized in that said means to control said means to shift comprises means to establish an electrical potential proportional to the lateral position of the edge of said first strip length, means to establish a second potential in proportion to the lateral position of the edge of said second strip length, and means to compare said potentials and control said means to shift in accordance with any difference therein in either direction of polarity.

5. Apparatus according to claim 4 further including a summation circuit for comparing said potentials, and means for inserting a variable biasing potential difference in said circuit whereby said control may be made to compensate for differences in the widths of said first and second strip lengths to cause said strip lengths to be aligned along their longitudinal center lines, if desired, rather than along their side edges.

6. In apparatus for joining metal strip lengths in general end-to-end relation and wherein means is provided to pre-load the head end portion of a second strip length into proper joining position within said apparatus while a first length of strip is running through said apparatus the improvement comprising means to detect the position of an edge of the first strip length, means to detect the position of the same side edge of the pre-loaded second strip length at a location adjacent the entry end of said apparatus, and automatic means comprising one of a superimposed pair of strip clamps to shift said head end pre-loaded portion of said second strip length laterally with respect to said first strip length when said first strip length is being brought to a stop preparatory to a joining cycle.

7. Apparatus according to claim 6 further characterized in that said means to shift comprises a clamp for the pre-loaded head end portion of said second strip length, said clamp being separate from the strip joining means, and means to move said clamp transversely of the normal path of longitudinal travel of the strip through said apparatus.

References Cited by the Examiner

UNITED STATES PATENTS

| | | | |
|---|---|---|---|
| 2,412,648 | 12/1946 | Rendel | 219—82 |
| 2,827,809 | 3/1958 | Beam | 226—19 X |
| 2,871,013 | 1/1959 | Markey | 226—22 X |
| 3,102,189 | 8/1963 | Jones et al. | 219—82 |

RICHARD M. WOOD, *Primary Examiner.*